UNITED STATES PATENT OFFICE.

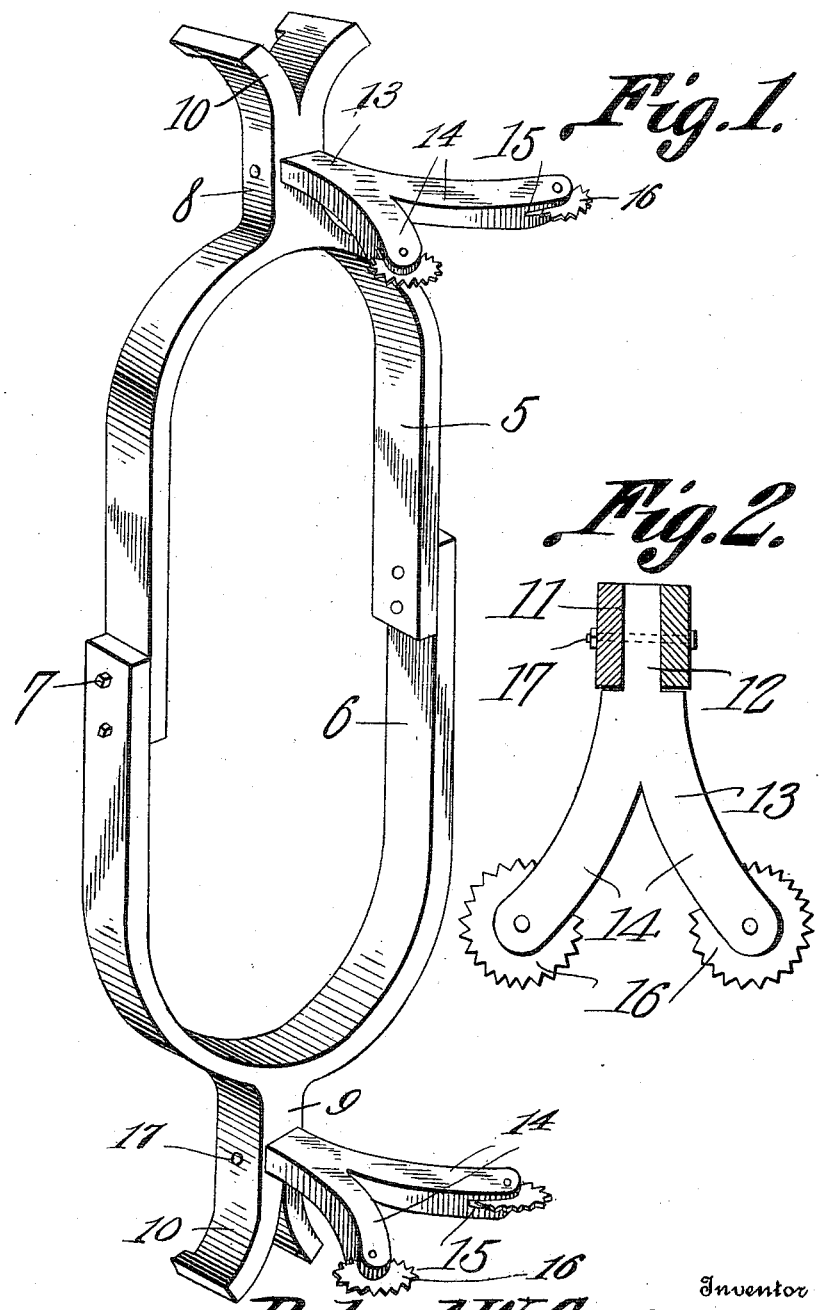

ROBERT W. CROSSMAN, OF TEXOLA, OKLAHOMA, ASSIGNOR OF ONE-THIRD TO JOHN E. WALKER, OF TEXOLA, OKLAHOMA.

ANIMAL-POKE.

964,758.  Specification of Letters Patent.  Patented July 19, 1910.

Application filed March 21, 1910. Serial No. 550,623.

*To all whom it may concern:*

Be it known that I, ROBERT W. CROSSMAN, a citizen of the United States, residing at Texola, in the county of Beckham and State of Oklahoma, have invented a new and useful Animal-Poke, of which the following is a specification.

The present invention aims to provide an improved construction of cattle poke which will be more effectual in its prodding action than are similar devices now in use. A common form of such devices is that which embodies a neck encircling yoke from the upper and lower ends of which project single arms carrying each but a single rowel, these arms being presented rearwardly when the device is in place upon the neck of the animal. In such a device, however, unless the animal brings the poke directly against the fence and neither to one side nor the other, the same will not be effectual, as the yoke will slip around upon the animal's neck and the rowels will not bite into the neck of the animal. In the present invention, in place of the single arms mentioned, double arms are employed and each arm carries a rowel at its extremity, the result being that when the poke is rocked upon the animal's neck, due to its coming into contact with a fence through which the animal is endeavoring to pass, both rowels of the upper or lower arms, as the case may be, come into contact with the neck of the animal, one at each side thereof. Thus, even should but one rowel engage with the neck of the animal, initially, the device will be guided to correct position finally, bringing both rowels into such engagement. Thus, the device is effectual, whether it be brought directly into contact with a fence, or brought into such contact in a side-wise manner.

In the accompanying drawings,—Figure 1 is a perspective view of the device embodying the present invention, and Fig. 2 is a horizontal sectional view taken in a plane with the lower arms.

The yoke of the poke consists of two U-shaped members, the upper one of which is indicated by the numeral 5 and the lower one by the numeral 6, these members being disposed with the member 5 in inverted position and secured at the extremities of its arms to the extremities of the corresponding arms of the member 6 by means of suitable bolts 7, although it will be readily understood that other securing devices may be employed if found expedient or desirable.

Integral with the intermediate portion or bow of each yoke member 5 and 6 is a stem, which, in the case of the member 5, is indicated by the numeral 8 and upstands, and in the case of the member 6, is indicated by the numeral 9 and depends. These stems 8 and 9 terminate each in a pair of spread or diverging branches, indicated by the numeral 10 which afford a broader bearing when the poke is brought into contact with a fence, than where a single straight stem is provided. Further owing to this relatively broad bearing which is afforded by the branches 10, the device coming in contact with a fence, will be centered upon the neck of the animal; in other words, should but one of the branches contact with the fence, the yoke will be canted upon the neck of the animal until the other associated branch comes into contact with the fence.

Each of the stems 8 and 9 is formed, adjacent its point of juncture, with the respective yoke member, with an opening 11 fitted within which is the tang 12 of a double or V-shaped rowel arm 13, the branches of which are indicated by the numeral 14 and are each bifurcated at their outer ends, as at 15. A rowel or spur 16 is journaled for rotation in the bifurcation in each branch, and these rowels are intended to engage with the neck of the animal when the device comes into contact with a fence through which the animal is endeavoring to pass. A bolt 17 is passed through the tang 12 and the respective stem in which it is fitted.

It will be readily understood from the foregoing that even should the poke not come into direct forward engagement with a fence through which the animal is endeavoring to pass, engagement with the fence in any manner whatsoever will result in at least one of the upper or lower rowels coming into contact with the animal's neck and that the contact of this rowel with the neck will serve as a fulcrum, so to speak, upon which the entire device may rock whereby to bring the related rowel also into such engagement.

What is claimed is:

In a device of the class described, a yoke, a stem projecting from the upper and lower ends of the yoke, each stem having two spread branches, the branches of the stem at the upper end of the yoke diverging upwardly and those of the stem at the lower end of the yoke diverging downwardly, an arm carried by each stem and projecting rearwardly therefrom and having two rearwardly diverging branches located in a horizontal plane, and a rowel carried at the extremity of each branch of each arm.

In testimony that I claim the foregoing as my own, I have hereto affixed my signature in the presence of two witnesses.

ROBERT W. CROSSMAN.

Witnesses:
GEO. SANDERS,
JABE DARNELL.